United States Patent [19]

Jaskowsky

[11] 4,065,661
[45] Dec. 27, 1977

[54] PHOTOFINISHING APPARATUS

[75] Inventor: Jörg Jaskowsky, Stuttgart-Wangen, Germany

[73] Assignee: Eastman Kodak Company, Rochester, N.Y.

[21] Appl. No.: 659,181

[22] Filed: Feb. 18, 1976

[51] Int. Cl.² ............... G06K 15/00; G03G 15/00
[52] U.S. Cl. ............................ 364/464; 355/6; 235/419
[58] Field of Search ............ 235/61.12 N, 61.11 E, 235/61.6 R; 355/6, 38, 68

[56] References Cited

U.S. PATENT DOCUMENTS

| | | | |
|---|---|---|---|
| 3,469,105 | 9/1969 | Stasey | 355/38 |
| 3,519,347 | 7/1970 | Bowker et al. | 355/38 |
| 3,689,742 | 9/1972 | Kagari et al. | 235/61.11 E |
| 3,694,074 | 9/1972 | Huboi et al. | 355/38 |
| 3,835,297 | 9/1974 | Inoue et al. | 235/61.12 N |

*Primary Examiner*—Daryl W. Cook
*Attorney, Agent, or Firm*—N. Rushefsky

[57] ABSTRACT

Photofinishing apparatus for producing photographic prints from originals such as positive transparencies, negative transparencies or positive reflection prints and for printing a customer bill is controlled by an electronic computer. Some data required for producing prints in the photographic printer is entered into the computer via an operator keyboard. Other data may be entered into the computer via a device that measures the size and format of the original, an exposure determining station, and a code reader for reading a code on the photofinishing envelope. The data is stored in a memory associated with the computer and is used to control the photographic printer. Pricing data is also contained in a memory associated with the computer. After the originals have been printed, the computer uses the pricing data and the data that was used to control the printer to control the customer billing printer. Such an arrangement eliminates the need for an operator to handle some of the same data twice, thus substantially reducing possibilities for error.

5 Claims, 2 Drawing Figures

PHOTOFINISHING APPARATUS

BACKGROUND OF THE INVENTION

1. Field of the Invention

The present invention relates to improved photofinishing apparatus and more particularly to such apparatus wherein some of the sub-assemblies for carrying out the various functions of the photofinishing cycle are controlled by an electronic computer.

2. Description of the Prior Art

In known photofinishing systems, the photofinishing operation is accomplished in a number of steps by a series of discrete equipment and machines. A customer order, when presented to the photofinishing system, includes some original material from which the prints are to be made, some customer-identifying information, and some order-identifying information including the size, type, and quantity of prints desired. As the customer orders are received, an operator separates the originals from the order information and the customer-identifying information and sets up a printer to produce the order based on the order-identifying information.

In the printer itself, exposure generally takes place onto photographic paper which is stored in the printer in roll form. The paper is wound off a supply roll, the prints are serially exposed on the paper, and the paper is wound up on a take-up after exposure. Negative or reversal paper is used, depending on the photographic polarity of the original. Known printers have varying degrees of automatic control. In cases where the original is in the form of long rolls of film or long support web rolls for mounted transparencies, fully automatic printers which operate with minimum manual aid are employed. A computer controls the working cycles and converts exposure data and mechanical sensor signals into instructions for the control of the printer. The computer processes the exposure data and controls the exposure time and the color composition of the light source in the printer according to the exposure calculations. An example of such a printer is the Kodak 2610 Color Printer manufactured by the Eastman Kodak Company.

After the prints have been made on the printer the rolls of exposed paper are taken from the printer and developed in a photographic processor. The roll of developed prints is then separated into individual prints by a print cutter.

An operator assembles the originals with the finished prints, the customer-identifying information, and the order information. An operator then computes the customer's bill based on the order information and any customer discount information that may be applicable and the billing information is included with the order.

Computer-operated billing systems are known which automatically compute the customer bill based on order information input by an operator and pricing data and customer discount data stored in the computer. An example of such a system is the Pakomp II, manufactured by the Pako Corporation.

At each stage of the photofinishing operation described above, steps must be taken to preserve the identity between the customer-identifying information, the originals and the copies. To preserve this identity, an order-identifying code is generally applied to the customer-identifying information, to the originals, and to the copies. It will be noted from the above description that some of the same information that is used to program the printer is also used later to compute the customer's bill. This duplication of information handling by an operator results in a risk that the information will be improperly encoded with the consequent possibility of mistakes being made in the orders.

SUMMARY OF THE INVENTION

The subject invention is based on the fact that a substantial part of the information used to control the printer in a photofinishing operation is also used in dealing with other aspects of the customer's order such as calculation of the bill. Accordingly, a photofinishing system is disclosed which includes a photographic printer for producing photographic prints from originals, a data entry station for producing signals representative of the requirements for producing the prints, a bill printer for printing the customer's bill, a memory for storing pricing data for the photographic prints, and an electronic computer control that is electrically connected to the photographic printer, the bill printer, and the pricing data memory for controlling the photographic printer in accordance with the signals from the data entry means and for controlling the bill printer in accordance with the signals from the data entry means and the pricing data stored in the pricing data memory.

BRIEF DESCRIPTION OF THE DRAWINGS

The invention will be described with reference to the figures. However, it is noted that the figures are intended to depict apparatus for implementing the inventive concept and it is not particularly intended to suggest herein that the specifics disclosed in the FIGS. are anything more than the showing of apparatus for implementing the concept of the invention in its broadest sense.

DESCRIPTION OF THE PREFERRED EMBODIMENT

The following description discloses a photofinishing system having a printer for making duplicate prints from original prints; however, the printer could just as well be a printer of the type that makes duplicate prints from original negative or positive transparencies. Although several automated steps are suggested below for accomplishing the data entry functions and the material handling operations performed during the photofinishing cycle, it will be understood that such data entry functions and material transport steps may be performed manually by the operator of the photographic apparatus.

Figure 1:
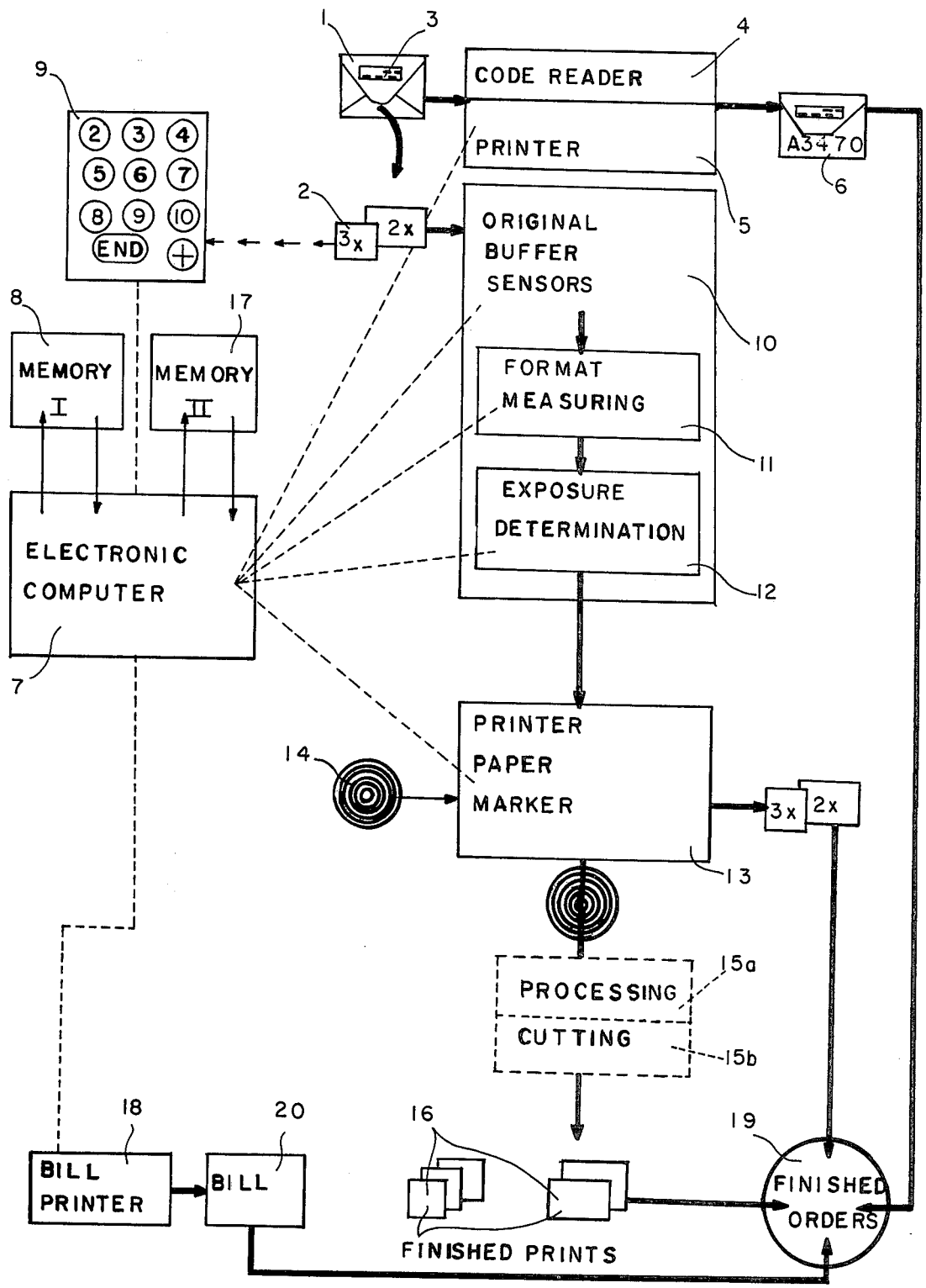
FIG. 1 is a block diagram showing a photofinishing system according to the present invention.

As shown in FIG. 1, the originals, in the form of opaque paper images, are supplied in a photofinishing envelope 1. The originals 2 are removed from the envelope by an operator and the envelope is inserted in a code reader 4. A code 3 which has previously been printed on the envelope, is read by the reader 4. The code for example may contain the customer's address to which the completed order is to be returned with the bill. The code reader is coupled to a printer 5 that automatically stamps an alphanumeric designation 6 on the envelope, for the identification of the order.

The alphanumeric designation is derived from the program of an electronic digital computer 7. The computer is electrically connected to a first memory 8 which stores all the data relating to the individual orders at least until the data are called for by a bill printer 18. The first memory 8 also stores the numbers provided via a keyboard 9 through which the operator enters the number of prints to be made from the originals 2. The operator also enters the information indicating the end of an order via keyboard 9. The end of order information is stored in the first memory 8 until called for by the computer. Keyboard 9 may be part of the apparatus that applies the code to the photofinishing envelope.

In the example the square original is to be reproduced three times and the rectangular one twice.

The originals 2 are fed into an original buffer 10 by the operator. Inside the buffer 10 there may be measuring points 11 for the measurement of the length and the width of the originals 2 and possibly a measuring point 12 for making exposure determination measurements for controlling the light source of the printer. In its simplest form, the measuring point 11 could be a set of fiducial marks on a work surface. When an original is placed on the work surface, the operator would read the dimensions of the original and input the dimensions to the computer via keyboard 9. Alternately, the measuring point 11 could include mechanical or electro-optical sensors to automatically measure the format of the original and to input the measurements to the computer. Measuring point 12 could comprise any of the known exposure control systems for automatic photographic printers. The buffer 10 may be controlled by the computer 7. The measured exposure data are stored in the first memory 8 until called, and possibly compared with stored standard distributions of exposure data in the computer 7 and processed in a known manner to derive classification data which are stored until ready for use by the computer to control the printer. The computer 7 controls the function of a photographic printer 13, taking into account the data stores in the computer via the keyboard 9 and other data that may have been entered via a measuring point 11, and an exposure determining station 12. If the original buffer is automatic, the computer would call the next original from the original buffer 10 as soon as the exposure station of the printer has been automatically cleared of the preceding original. The buffer 10 may contain sensors, the signals from which could be processed by the computer 7 into instructions for an electromechanical positioning of the originals 2 in the buffer 10 and in the photographic printer 13. The reversal paper which is used in the photographic printer 13 is supplied from a roll 14. The printer 13 automatically provides the paper with cutting marks and marks indicating the end of an order in a known manner. The information as to the end of the order comes from the first memory 8 and the computer 7. The alphanumeric designation 6 printed on the envelope by the printer 5 can also be wholly or partly transferred to the paper in code form, e.g., by punched holes, between every two pictures. This enbles the orders to be automatically identified when they are complete and are being assembled at the order assembly station 19. The exposed roll of paper is developed by the processor 15a and the individual prints are separated from the roll in a known manner at the print cutter 15b. Finally the finished prints 16, the original envelope 1, and the originals 2 are brought together at the order assembly station 19.

A bill 20 printed by a bill printer 18 controlled by the computer 7 is then added to the order. In accordance with the program, the computer 7 processes the data from the code reader 4, the keyboard 9, and the format measuring station 11, which are held in the first memory 8, into a work record, using for the computing operation additional data from a second memory 17 in accordance with the program. The additional data in the second memory 17, includes, for example, prices depending on the sizes of the originals and the finished prints and discount rates for specific customers.

Figure 2:
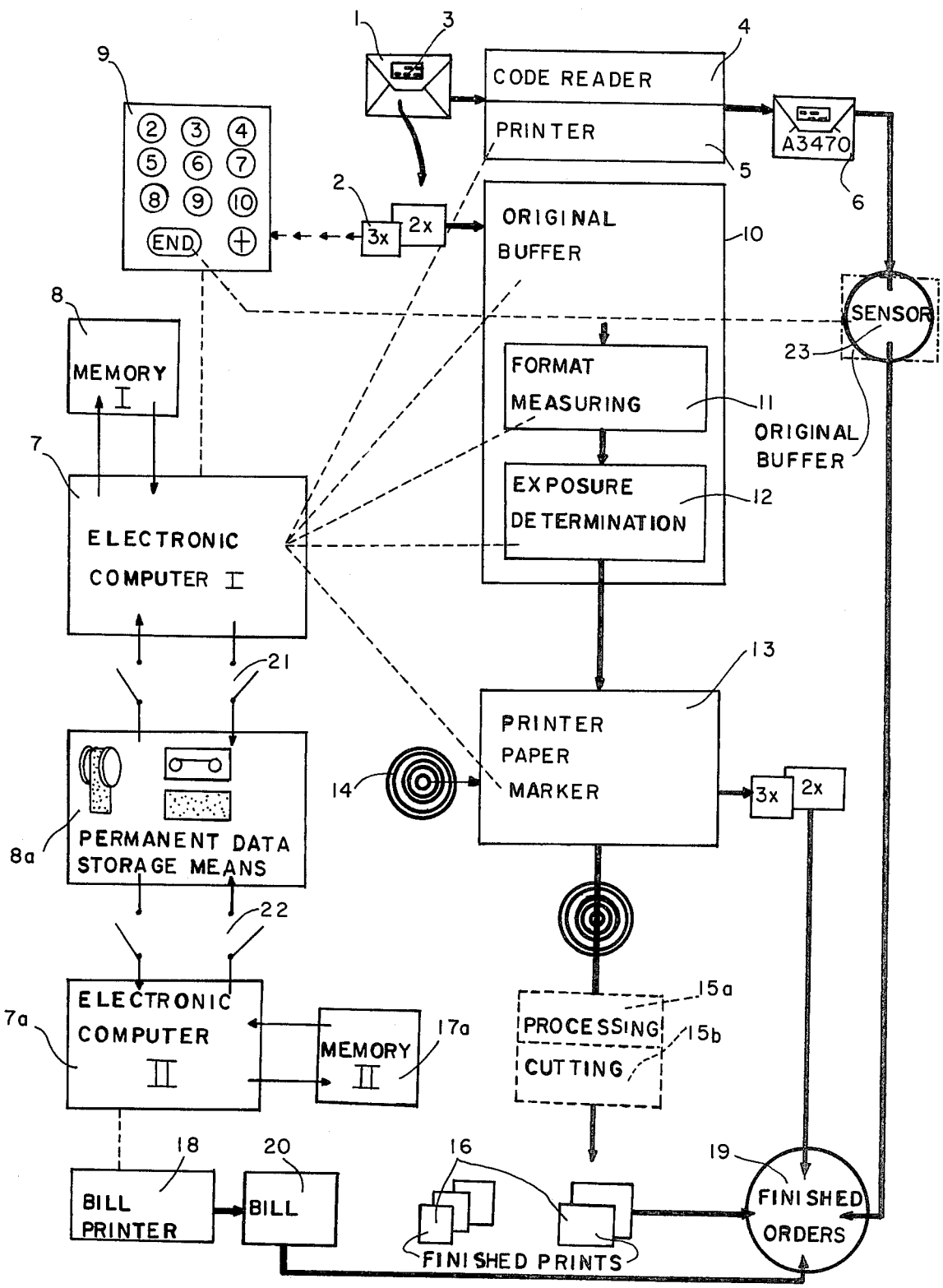
FIG. 2 is a block diagram showing a more extensive embodiment of the photofinishing system shown in FIG. 1.

A variation of the photofinishing system according to the invention is shown in FIG. 2. In FIG. 2 the data stored in the first storage means 8 is at least partially transferred by the electronic computer 7 to a permanent data storage means 8a such as a paper tape or a magnetic tape. This variation makes it possible to limit the capacity of the first memory 8 and to erase the data in the first memory when an order has been printed.

A further variation shown in FIG. 2 is the use of a second electronic computer 7a to control the bill printer 18 for printing out the order record and the customer bill 20. This second computer 7a uses the data stored in the permanent data storage means 8a and the data stored in a second storage means 17a which is separate from the first computer 7. This variation enables the billing to be computed in a separate physical location from the main system while maintaining the desirable feature of having to input the order data only once.

Finally, the envelope 1 for the originals can be used to give the computer 7 the "end of order" command instead of accomplishing this manually via the keyboard 9 with the aid of an optical or electromechanical sensor 23. The original envelope 1 can also be conveyed via the original buffer 10 and the printer 13 along the same transport path as that provided for the originals 2. This makes it easier to unite the originals 2 and the envelopes 1 with the completed prints 16 and the bill 20 when the completed order is being assembled. One is able to use the alphanumeric designation 6 on the envelope to identify the corresponding finished prints and bill.

FIG. 2 shows the end-of-order sensor 23 and the variations in the electronic data processing system. The electronic computer 7 is so programmed that it transfers the data relative to the order record and the bill from the first memory 8 to the permanent data storage means 8a after the prints have been processed. The permanent data storage means 8a can be a paper tape, a magnetic tape, a cartridge, or a punched card and can be separated from the first computer 7 by means of a switch 21 and transported to the second electronic computer 7a and connected by means of a switch 22.

The second storage means 17a is connected to the second computer 7a. It contains, for instance, prices per size, customer data, and discount rates. The second computer 7a controls the bill printer 18. Since the permanent data storage means 8a can be transported and placed in permanent storage, it can be used later on to produce statistical working data from accounts covering a long period of time with the aid of a general electronic data processing system.

By means of automatic code conversion and electronic storage of information, the invention eliminates the duplication of effort involved in programming the photographic printer and in calculating the customer bill. Furthermore, by using electronic data storage in an automatic printer it is possible to reliably identify all parts of an order and to make use of information identifying the customer which information is encoded on the order envelope and which can be read by machine, thereby dispensing with manual typing and eliminating the possibility of mistakes in reading the customer identifying information. Finally, the electronic computer may be used to control the transport of the originals and of the photofinishing envelope through the photofinishing system and also to control the measuring and sensing points within the photofinishing system.

It will be apparent that a printer according to the invention can also be used to print mounted slides for individual or short negative filmstrips such as are found among orders for reprints sent to photofinishing laboratories.

The invention has been described in detail with particular reference to preferred embodiments thereof, but it will be understood that variations and modifications can be effected within the spirit and scope of the invention.

I claim:

1. Photofinishing apparatus, comprising:
  a. photographic printing means for producing photographic prints from originals;
  b. data entry means for producing signals representative of the requirements for producing the prints;
  c. bill printing means for printing a customer bill;
  d. storage means for storing pricing data for the photographic prints; and
  e. electronic computer control means electrically connected to said photographic printing means, said bill printing means, and said pricing data storage means for controlling said photographic printing means in response to said signals produced by said data entry means and for controlling said bill printing means in response to said signals produced by said data entry means and said pricing data stored in said pricing data storage means, whereby said data entered into said data entry means is entered only once thereby reducing the possibility of error in the printing of the bill.

2. The invention claimed in claim 1 wherein the originals are contained in envelopes bearing coded data, said data entry means further including means for reading the coded data on the envelopes and said photofinishing apparatus further comprising means for printing an alphanumeric designation corresponding to said coded data on the envelope, said printing means being controlled by said electronic computer control means.

3. The invention claimed in claim 1 wherein the originals are received in photofinishing envelopes and said photofinishing apparatus further comprises:
  a. an order assembly station where the originals, the prints, the customer's bill and the photofinishing envelopes are assembled together;
  b. conveyor means for transporting the photofinishing envelopes from the data entry means to said order assembly station; and
  c. sensing means for sensing the presence of a photofinishing envelope on said conveyor means and responsive thereto for providing an end of order signal to said electronic computer means.

4. The invention claimed in claim 1 wherein the originals are received in photofinishing envelopes bearing coded information and said data entry means includes means for reading the coded data on the photofinishing envelopes and producing signals representative of the coded data.

5. The invention claimed in claim 4 further comprising:
  means for printing an alphanumeric designation on the photofinishing envelope corresponding to the coded data, said alphanumeric printing means being electrically connected to said electronic computer control means; and
  said electronic computer control means including means for controlling said alphanumeric printer in accordance with the signals representative of the coded data from the data entry means.

* * * * *

UNITED STATES PATENT OFFICE
CERTIFICATE OF CORRECTION

PATENT NO. : 4,065,661
DATED : December 27, 1977
INVENTOR(S) : Jörg Jaskowsky

It is certified that error appears in the above-identified patent and that said Letters Patent are hereby corrected as shown below:

To the title page, the following is added:

[30] Foreign Application Priority Data
    April 26, 1975  Germany... 25 18 727

Signed and Sealed this

Thirteenth Day of February 1979

[SEAL]

Attest:

RUTH C. MASON
*Attesting Officer*

DONALD W. BANNER
*Commissioner of Patents and Trademarks*